(12) United States Patent
Zhang et al.

(10) Patent No.: US 11,530,880 B2
(45) Date of Patent: Dec. 20, 2022

(54) PHASE-CHANGE ENERGY-STORAGE STRUCTURE FOR BUILDING INSULATION

(71) Applicant: SOUTH CHINA UNIVERSITY OF TECHNOLOGY, Guangzhou (CN)

(72) Inventors: Zhengguo Zhang, Guangzhou (CN); Xiaoming Fang, Guangzhou (CN); Lulu Fu, Guangzhou (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 494 days.

(21) Appl. No.: 16/622,772

(22) PCT Filed: Nov. 20, 2017

(86) PCT No.: PCT/CN2017/111891
§ 371 (c)(1),
(2) Date: Dec. 13, 2019

(87) PCT Pub. No.: WO2018/227879
PCT Pub. Date: Dec. 20, 2018

(65) Prior Publication Data
US 2020/0408471 A1    Dec. 31, 2020

(30) Foreign Application Priority Data
Jun. 13, 2017   (CN) .......................... 201710442799.3

(51) Int. Cl.
*F28D 20/02* (2006.01)
*C09K 5/06* (2006.01)
(Continued)

(52) U.S. Cl.
CPC ............ *F28D 20/023* (2013.01); *C09K 5/063* (2013.01); *E04B 1/7608* (2013.01);
(Continued)

(58) Field of Classification Search
CPC ...... C09K 5/063; E04B 1/7608; E04B 1/7675; E04B 1/80; E04B 2/00; E04B 2103/00;
(Continued)

(56) References Cited

U.S. PATENT DOCUMENTS

| 4,259,401 A | * | 3/1981 | Chahroudi | .............. E04C 1/392 |
| | | | | 428/305.5 |
| 4,572,864 A | * | 2/1986 | Benson | .................... C09K 5/00 |
| | | | | 428/116 |

(Continued)

FOREIGN PATENT DOCUMENTS

| CN | 101413299 A | | 4/2009 |
| CN | 101476357 A | * | 7/2009 |

(Continued)

*Primary Examiner* — James M Ference
(74) *Attorney, Agent, or Firm* — Muncy, Geissler, Olds & Lowe, P.C.

(57) ABSTRACT

A phase-change energy-storage structure for building insulation. The wall structure is provided with a wall base, an insulation layer, an oriented structural board, a shaped phase-change energy-storage insulation board, and an exterior decorative board in sequence from outdoor to indoor. The shaped phase-change energy-storage insulation board is composed of an inorganic composite phase-change material and a packaging sheet. The inorganic composite phase-change material has a phase-change temperature of 10 to 40° C., obtained by compounding an inorganic hydrated salt and a porous structural carrier. In the inorganic composite phase-change material, a mass percentage of the inorganic hydrated salt is 40 to 95%, and the inorganic composite phase-change material is coated with a fire resistant and corrosion resistant light-cured resin. The coldness in outdoor air in summer night can be stored in the phase-change energy-storage insulation board, which can be released into the indoor air during the day.

10 Claims, 2 Drawing Sheets

(51) Int. Cl.
  *E04B 1/76* (2006.01)
  *E04B 1/80* (2006.01)
  *F28D 20/00* (2006.01)

(52) U.S. Cl.
  CPC .............. *E04B 1/7675* (2013.01); *E04B 1/80* (2013.01); *E04B 2103/00* (2013.01); *F28D 2020/0008* (2013.01)

(58) Field of Classification Search
  CPC ................. F24F 5/0017; F28D 20/023; F28D 2020/0008; Y02E 60/14
  See application file for complete search history.

(56) References Cited

U.S. PATENT DOCUMENTS

| | | | | |
|---|---|---|---|---|
| 5,087,508 A * | 2/1992 | Beck | ........................ | G09F 7/002 428/323 |
| 5,532,039 A * | 7/1996 | Payne | ..................... | B32B 15/08 428/323 |
| 5,755,216 A * | 5/1998 | Salyer | ........................ | E04C 1/41 126/618 |
| 6,860,079 B2 * | 3/2005 | Schwarz | ................. | F24S 20/61 52/794.1 |
| 7,735,327 B2 * | 6/2010 | Brower | ................... | F28D 20/02 62/530 |
| 7,797,950 B2 * | 9/2010 | Brower | ................. | F24F 5/0021 62/235.1 |
| 8,474,514 B2 * | 7/2013 | Fischer | ..................... | F24D 3/14 165/47 |
| 9,279,075 B2 * | 3/2016 | Parker | .................... | C09K 5/063 |
| 9,359,766 B2 * | 6/2016 | Shiao | ........................ | E04D 5/10 |
| 9,410,022 B2 * | 8/2016 | Bienerth | .................... | C08J 5/18 |
| 9,499,986 B2 * | 11/2016 | Kalkanoglu | ............. | E04D 13/12 |
| 2005/0055982 A1 * | 3/2005 | Medina | ..................... | E04B 1/80 52/506.01 |
| 2006/0272281 A1 * | 12/2006 | Marshall | ................ | D21H 27/20 52/796.1 |
| 2011/0281485 A1 * | 11/2011 | Rolland | .................... | E04B 1/80 428/221 |
| 2012/0096716 A1 * | 4/2012 | Tran | ...................... | F28D 20/023 29/897.3 |
| 2012/0196040 A1 * | 8/2012 | Wilk, Jr. | .............. | C04B 41/4523 427/398.1 |
| 2016/0123009 A1 * | 5/2016 | Ayambem | ............... | B32B 27/20 252/73 |
| 2016/0168439 A1 * | 6/2016 | Ayambem | ................ | C08J 3/126 428/484.1 |
| 2016/0201995 A1 * | 7/2016 | Oliva Llena | ............ | F28F 21/04 165/10 |
| 2018/0282998 A1 * | 10/2018 | Wang | .................. | E04D 13/1662 |
| 2020/0408471 A1 * | 12/2020 | Zhang | .................. | E04B 1/7675 |

FOREIGN PATENT DOCUMENTS

| | | | | |
|---|---|---|---|---|
| CN | 101476357 A | | 7/2009 | |
| CN | 205935385 U | * | 2/2017 | |
| CN | 205935385 U | | 2/2017 | |
| CN | 106753254 A | * | 5/2017 | ............. C09K 5/063 |
| CN | 106753254 A | | 5/2017 | |
| CN | 107227807 A | | 10/2017 | |
| DE | 102014011705 A1 | | 2/2016 | |

\* cited by examiner

PHASE-CHANGE ENERGY-STORAGE STRUCTURE FOR BUILDING INSULATION

CROSS-REFERENCE TO RELATED APPLICATIONS

This application is the U.S. national phase of PCT Application PCT/CN2017/111891 filed on Nov. 20, 2017, which claims a priority to China Patent Application No. 201710442799.3 filed on Jun. 13, 2017, the disclosures of which are incorporated in their entirety by reference herein.

FIELD

The disclosure relates to a building insulation structure, in particular, to a phase-change energy-storage structure for building insulation, which belongs to the technical field of building insulation.

BACKGROUND

With the continuous development of economy, the proportion of energy consumed by building heating and cooling in the total energy consumption continues to rise. Specifically, the building energy consumption accounts for about 32% of the global total energy consumption, and the greenhouse gas emissions caused by buildings can reach 30% of the total amount. Traditional light building materials have a small heat capacity and poor heat storage capacity, which cannot meet the requirements for human comfortableness. Therefore, developing a new building energy-storage material is of great significance for the realization of building energy-saving.

Phase-change materials have large latent heat and energy storage density, so that the energy can be stored and released by using heat absorption and heat releasing during the phase change process, and the temperature remains constant during the process. Therefore, applying the phase-change material to a building wall and envelopes can improve its thermal inertia, increase heat storage capacity, delay the time when indoor temperature reaches a maximum value, reduce fluctuations of indoor temperature, and decrease the energy consumption for air conditioning and building heating as well as improving the living comfortableness.

Currently, researches on phase-change energy-storage materials mainly employ a combination of organic phase change materials and building materials. For example, Chinese invention patent CN104674978 B discloses a building exterior wall structure with a double-layer shaped phase-change material layer, wherein an inner shaped phase-change wallboard layer and an outer shaped phase-change wallboard are placed on the inner and outer surfaces of the wall, and the phase-change material for the inner shaped phase-change wallboard layer and the outer shaped phase-change wallboard consist of paraffin, polyethylene and expanded graphite. However, since paraffin, polyethylene and expanded graphite are flammable, there are hidden risks of firing in safety, and the price of organic phase-change materials is generally high, which limits its practical application in building walls. And also, directly using an inorganic phase-change material may have a disadvantage of phase separation and large degree of undercooling, which affects the persistence of the application of phase-change materials in the wall.

SUMMARY

The technical problem to be solved by the disclosure is, in view of the shortcomings of the prior art, to provide a phase-change energy-storage structure for building insulation with low cost and good flame retardant effect, which may effectively overcome the disadvantages of phase separation and large degree of undercooling of inorganic phase-change materials.

In the disclosure, compounding an inorganic hydrated salt with a nucleating agent and a porous carrier may well solve the disadvantages of phase separation and large degree of undercooling of the inorganic hydrated salt. In the disclosure, encapsulating the prepared inorganic hydrated salt composite phase-change material with a fire resistant sheet may improve the durability and cycleability of the phase-change materials and obtain a shaped phase-change energy-storage insulation board. Since the inorganic hydrated salt phase-change materials have characteristics of cheapness and good availability, high energy-storage density, large phase-change latent heat and non-flammability, the inorganic hydrated salt composite phase-change material of the disclosure will have broad application prospects in the field of building insulation materials.

The technical problem to be solved by the disclosure is realized by the following technical solutions: A phase-change energy-storage structure for building insulation comprises a shaped phase-change energy-storage insulation board provided at an interior wall surface of the building, wherein the wall structure is provided with a wall base, an insulation layer, an oriented structural board, the shaped phase-change energy-storage insulation board, and an exterior decorative board in sequence from outdoor to indoor; the shaped phase-change energy-storage insulation board is composed of an inorganic composite phase-change material and a packaging sheet; the inorganic composite phase-change material has a phase-change temperature of 10 to 40° C., obtained by compounding an inorganic hydrated salt and a porous structural carrier; in the inorganic composite phase-change material, a mass percentage of the inorganic hydrated salt is 40 to 95%, and the inorganic composite phase-change material is coated with a fire resistant and corrosion resistant light-cured resin.

To further achieve the object of the disclosure, preferably, the shaped phase-change energy-storage insulation board is prepared by steps of:

(1) heating and melting an inorganic salt, a deionized water and a nucleating agent or directly heating and melting the inorganic hydrated salt, to obtain an inorganic hydrated salt phase-change substance in a liquid state, wherein the nucleating agent is one or more of borax, strontium chloride hexahydrate, $CaF_2$, C powder, and $Na_4P_2O_7 \cdot 6H_2O$, and a mass ratio of the nucleating agent to the inorganic hydrated salt is 0.5:99.5 to 10:90;

(2) adsorbing the inorganic hydrated salt phase-change substance in a molten state on the surface and inside of pores of the porous structural carrier material in a vacuum environment, and stirring sufficiently;

(3) curing at a temperature lower than a phase-change temperature of the inorganic hydrated salt phase-change material to obtain the inorganic composite phase-change material;

(4) coating the prepared inorganic composite phase-change material with the fire resistant and corrosion resistant light-cured resin;

(5) encapsulating the coated inorganic composite phase-change material in the packaging sheet to obtain the shaped phase-change energy-storage insulation board.

Preferably, the wall base is built by a sand-lime brick and a cement-floated layer;

the insulation layer is a fire resistant insulation panel; the fire resistant insulation panel is one or more of ceramic insulation board, XPS extruded board, EPS foam board, foam cement, perlite and perlite brick, vermiculite and vermiculite brick, phenolic foam, rubber-plastic sponge, glass wool, rock wool and aerogel felt, with a thickness of 5 mm to 200 mm.

Preferably, the oriented structural board is one or more of plywood, medium-density fiberboard (MDF), oriented strand board (OSB), blockboard and finger jointed board, with a thickness of 1 mm to 100 mm; the exterior decorative board is one or more of gypsum board, splint, aluminum veneer, PVC ceiling, stained glass, aluminum-plastic board, with a thickness of 1 mm to 50 mm; the exterior decorative board has a groove matching the shaped phase-change energy-storage insulation board.

Preferably, the packaging sheet is aluminum foil bag, PVC board, fiber cloth bag or vacuum bag; the packaging sheet has a thickness of 0.2 mm to 20 mm; the packaging sheet forms a cavity structure. Preferably, a surface of the packaging sheet is affixed with a high-temperature resistant and fire resistant foil aluminum fiber cloth.

Preferably, the inorganic hydrated salt is one or more of sodium acetate trihydrate, sodium thiosulfate pentahydrate, calcium chloride hexahydrate, magnesium chloride hexahydrate, magnesium nitrate hexahydrate, magnesium nitrate heptahydrate, barium hydroxide octahydrate, sodium sulfate decahydrate, sodium hydrogen phosphate dodecahydrate, ammonium aluminium sulfate dodecahydrate and aluminum sulfate octadecahydrate.

Preferably, the porous structural carrier is one or more of expanded graphite, expanded perlite, expanded vermiculite, diatom bodies, montmorillonite, foam aluminum, foam copper, carbon foam, fumed silica, and aluminum oxide.

Preferably, the fire resistant and corrosion resistant resin is one or two of epoxy acrylate and polyurethane.

Preferably, the wall base, the insulation layer, the oriented structural board, the shaped phase-change energy-storage insulation board, and the exterior decorative board are bonded by a foam rubber. Compared with the prior art, the disclosure has the following advantages and beneficial effects:

1) The disclosure has a good effect of insulation, wherein the coldness in outdoor air in summer night can be stored in the phase-change energy-storage insulation board, and released to the indoor air during the day, so that delaying the time when indoor temperature reaches a maximum value is achieved, and fluctuations of the indoor temperature are reduced, thereby improving the comfortableness and reducing the energy consumption for air conditioning in summer.

2) During the preparation process of the inorganic composite phase-change material in the disclosure, by adding an appropriate amount of nucleating agent and compounding it with the porous inorganic carrier, the disadvantages of phase separation and large degree of undercooling of the inorganic hydrated salt may be well overcome.

3) The compounded inorganic composite phase-change material in the disclosure is coated after light-curing the resin with fire and corrosion resistance on the surface of inorganic composite phase-change material particles, so that liquid leakage in the inorganic composite phase-change material may be avoided during use, thereby significantly enhancing the durability.

4) The shaped phase-change energy-storage board of the disclosure may give full play to the advantages of the inorganic phase-change materials, which has characteristics of cheapness and good availability, high energy-storage density, large phase-change latent heat and non-flammability, improving the thermal inertia of the wall, and delaying the time when indoor temperature reaches a maximum value.

5) The wall structure of the disclosure may focus on utilizing the insulation materials for effective insulation and effectively reduce the range of fluctuations for the indoor temperature. The test results have shown that compared with the situation where no shaped phase-change energy-storage insulation board is disposed inside the outer decorative board, the temperature fluctuation in the experimental room is reduced by more than 5° C., and the appearance of maximum temperature is delayed by more than 25 minutes when the cavity structure of the disclosure is applied, exhibiting outstanding effects.

6) The wall structure of the disclosure has a broad source of materials, has a relatively low cost, is easily formed, and convenient for practical applications and field constructions.

DETAILED DESCRIPTION OF THE EMBODIMENTS

The specific technical solutions of the disclosure will be further described below with reference to the drawings, so as to make those skilled in the art further understand the disclosure. However the embodiments should not limit the scope of the disclosure.

Figure 1:
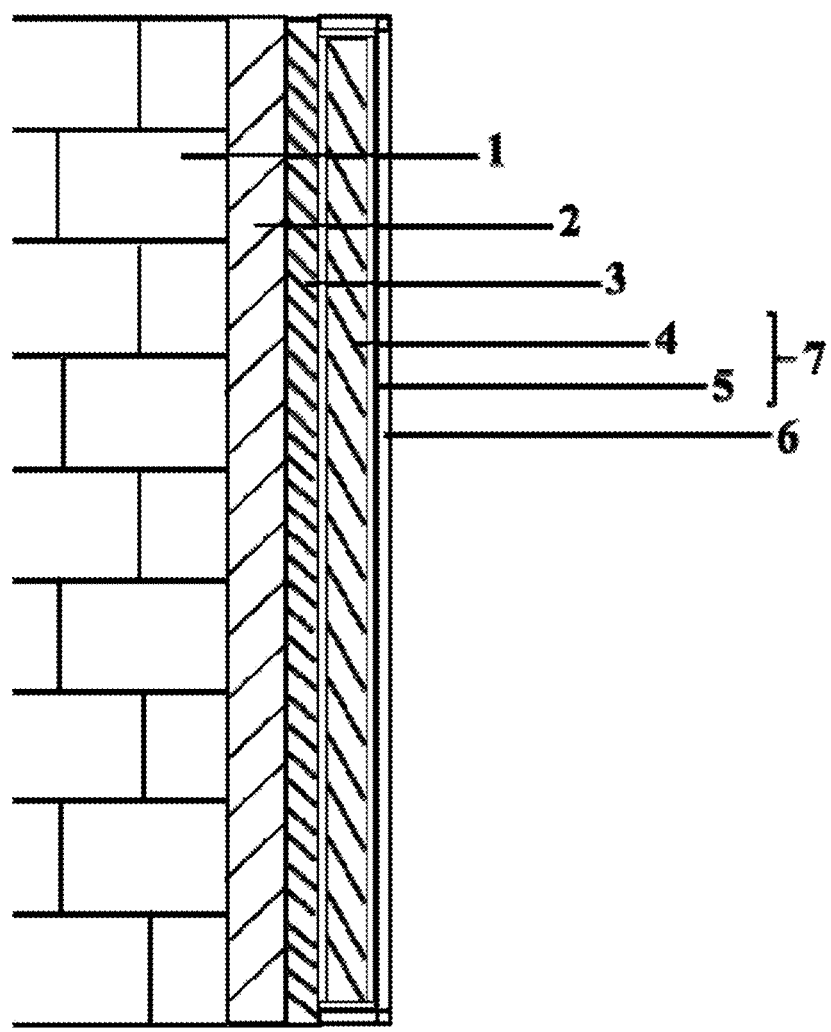
FIG. 1 is a diagram showing the structure of the phase-change energy-storage structure for building insulation of the subject invention.
Figure 2:
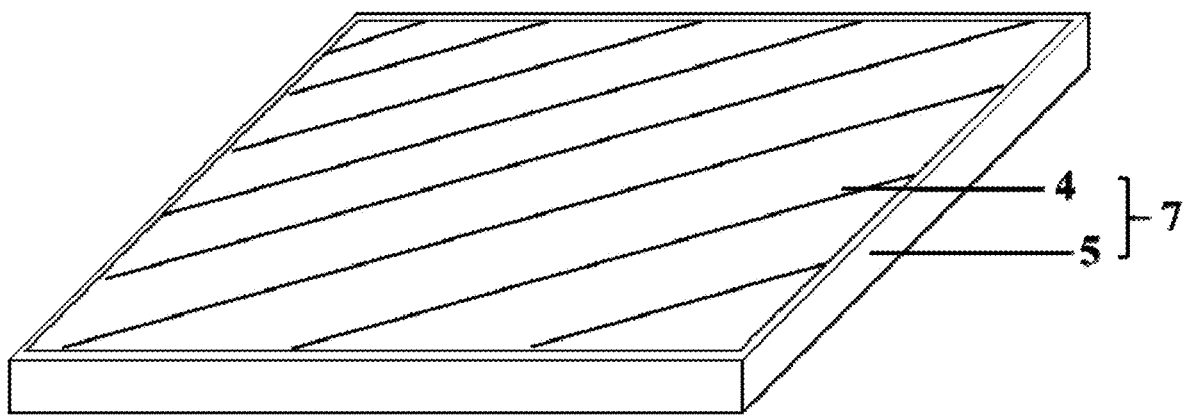
FIG. 2 is a diagram showing the structure of the shaped phase-change energy-storage insulation board.

As shown in FIGS. 1 and 2, a phase-change energy-storage structure for building insulation of embodiments of the disclosure comprises a shaped phase-change energy-storage insulation board 7 provided at an interior wall surface of the building, wherein the wall structure is provided with a wall base 1, an insulation layer 2, an oriented structural board 3, a shaped phase-change energy-storage insulation board 7, and an exterior decorative board 6 in sequence from outdoor to indoor. The shaped phase-change energy-storage insulation board 7 is composed of an inorganic composite phase-change material 4 and a packaging sheet 5.

Embodiment 1

The wall base 1 is built by a sand-lime brick and a cement-floated layer. An EPS foam board with a thickness of 200 mm is selected as the insulation layer 2, and a plywood board with a thickness of 100 mm is used as the oriented structural board 3. Inorganic hydrated salts, i.e., magnesium chloride hexahydrate and magnesium nitrate hexahydrate, are mixed and melted to obtain a molten phase-change material of magnesium chloride hexahydrate/magnesium nitrate hexahydrate, which is then compounded with expanded graphite carrier to obtain a novel inorganic composite phase-change material of expanded graphite based magnesium chloride hexahydrate/magnesium nitrate hexahydrate, with a phase-change temperature of 40° C., wherein the molten phase-change material of magnesium chloride hexahydrate/magnesium nitrate hexahydrate accounts for 95% of the mass of the composite phase-change material. The composite phase-change material is a solid at room temperature. Then propylene oxide resin with a mass fraction of 5% is light-cured on the surface of the composite phase-change material to coat it, which may greatly enhance the durability of the inorganic composite phase-change material. The obtained inorganic composite phase-change material is subjected to a test for degree of undercooling, which is decreased by 10° C. as compared with the phase-change material of magnesium chloride hexahydrate/magnesium nitrate hexahydrate, thus the degree of undercooling is greatly decreased and no liquid leakage occurs. A aluminum foil bag with a thickness of 20 mm is used as the packaging sheet 5 for the inorganic composite phase-change material, the composite phase-change material coated with the resin is filled in a cavity of the packaging sheet to obtain the shaped phase-change energy-storage insulation board 7, and a plaster board with a thickness of 50 mm is used as the exterior decorative board 6, obtaining a structure shown in FIG. 1.

In the disclosure, the inorganic hydrated salts, i.e., magnesium chloride hexahydrate and magnesium nitrate hexahydrate, instead of flammable phase-change materials such as paraffin, polyethylene and expanded graphite, are used as phase-change materials, so that the embodiment effectively solves the problem of using flammable phase-change materials in the prior art.

An experiment room and a reference room are constructed adopting the above wall structure, and the temperature fluctuation in the room over time is measured under one unit of sunlight intensity, wherein the shaped phase-change energy-storage insulation board 7 is placed inside the exterior decorative board of the experimental room, and no shaped phase-change energy-storage insulation board 7 is placed inside the exterior decorative board of the reference room. Then, the test results show that for the experiment room, the temperature fluctuation is decreased by 18° C., and the appearance of maximum temperature is delayed by 90 minutes; for the reference room, the temperature fluctuation is decreased by 10° C., and the appearance of maximum temperature is delayed by 20 minutes. Therefore, the above results indicate that the wall structure containing the shaped phase-change energy-storage insulation board has more excellent heat storage capacity, may obviously improve the thermal inertia of the wall and delay the time when indoor temperature reaches a maximum value as well as reducing the range of indoor temperature fluctuation, thereby decreasing the energy consumption for air conditioning and building heating as well as improving comfortableness.

Embodiment 2

The present embodiment differs from Embodiment 1 in that the insulation board is a ceramic insulation board with a thickness of 100 mm. Similar to Embodiment 1, the test results show that for the experiment room, the temperature fluctuation is decreased by 16° C., and the appearance of maximum temperature is delayed by 80 minutes; for the reference room, the temperature fluctuation is decreased by 8° C., and the appearance of maximum temperature is delayed by 10 minutes. Therefore, the above results indicate that the wall structure containing the shaped phase-change energy-storage insulation board has more excellent heat storage capacity, and may obviously improve the thermal inertia of the wall and delay the time when indoor temperature reaches a maximum value as well as reducing the range of indoor temperature fluctuation. The insulation effect of this experiment room is slightly worse than that of Embodiment 1, because the thermal conductivity of ceramic insulation board is higher than that of EPS foam board, then the thickness of the insulation layer becomes smaller.

Embodiment 3

The present embodiment differs from Embodiment 1 in that the insulation board is an XPS extruded board with a thickness of 50 mm.

Similar to Embodiment 1, the test results show that for the experiment room, the temperature fluctuation is decreased by 17° C., and the appearance of maximum temperature is delayed by 85 minutes; for the reference room, the temperature fluctuation is decreased by 9° C., and the appearance of maximum temperature is delayed by 15 minutes. Therefore, the above results indicate that the wall structure containing the shaped phase-change energy-storage insulation board has more excellent heat storage capacity, and may obviously improve the thermal inertia of the wall and delay the time when indoor temperature reaches a maximum value as well as reducing the range of indoor temperature fluctuation. The insulation effect of this experiment room is similar to that of Embodiment 1, because the thermal conductivity of the XPS extruded insulation board is lower than the EPS foam board.

Embodiment 4

The present embodiment differs from Embodiment 1 in that the insulation board is a foam cement with a thickness of 30 mm. Similar to Embodiment 1, the test results show that for the experiment room, the temperature fluctuation is decreased by 10° C., and the appearance of maximum temperature is delayed by 60 minutes; for the reference room, the temperature fluctuation is decreased by 5° C., and the appearance of maximum temperature is delayed by 10 minutes. Therefore, the above results indicate that the wall structure containing the shaped phase-change energy-storage insulation board has more excellent heat storage capacity, and may obviously improve the thermal inertia of the wall and delay the time when indoor temperature reaches a maximum value as well as reducing the range of indoor temperature fluctuation. The insulation effect of this experiment room is worse than that of Embodiment 1, because the thermal conductivity of foam cement insulation board is similar to that of EPS foam board, but the thickness of the foam cement insulation board is much smaller than the EPS foam board.

Embodiment 5

The present embodiment differs from Embodiment 1 in that the insulation board is a glass wool with a thickness of 20 mm. Similar to Embodiment 1, the test results show that for the experiment room, the temperature fluctuation is decreased by 8° C., and the appearance of maximum temperature is delayed by 50 minutes; for the reference room, the temperature fluctuation is decreased by 3° C., and the appearance of maximum temperature is delayed by 6 minutes. Therefore, the above results indicate that the wall structure containing the shaped phase-change energy-storage insulation board has more excellent heat storage capacity, and may obviously improve the thermal inertia of the wall and delay the time when indoor temperature reaches a maximum value as well as reducing the range of indoor temperature fluctuation. The insulation effect of this experiment room is worse than that of Embodiment 1, because the thermal conductivity of glass wool insulation board is similar to that of EPS foam board, but the thickness of the glass wool insulation board is much smaller than the EPS foam board.

Embodiment 6

The present embodiment differs from Embodiment 1 in that the insulation board is a phenolic foam with a thickness of 15 mm. Similar to Embodiment 1, the test results show that for the experiment room, the temperature fluctuation is decreased by 9° C., and the appearance of maximum temperature is delayed by 55 minutes; for the reference room, the temperature fluctuation is decreased by 3° C., and the appearance of maximum temperature is delayed by 7 minutes. Therefore, the above results indicate that the wall structure containing the shaped phase-change energy-storage insulation board has more excellent heat storage capacity, and may obviously improve the thermal inertia of the wall and delay the time when indoor temperature reaches a maximum value as well as reducing the range of indoor temperature fluctuation. The insulation effect of this experiment room is worse than that of Embodiment 1, because the thermal conductivity of phenolic foam insulation board is smaller than that of EPS foam board, but the thickness of the phenolic foam insulation board is much smaller than the EPS foam board.

Embodiment 7

The present embodiment differs from Embodiment 1 in that the insulation board is a rubber-plastic sponge with a thickness of 10 mm. Similar to Embodiment 1, the test results show that for the experiment room, the temperature fluctuation is decreased by 6° C., and the appearance of maximum temperature is delayed by 30 minutes; for the reference room, the temperature fluctuation is decreased by 2° C., and the appearance of maximum temperature is delayed by 5 minutes. Therefore, the above results indicate that the wall structure containing the shaped phase-change energy-storage insulation board has more excellent heat storage capacity, and may obviously improve the thermal inertia of the wall and delay the time when indoor temperature reaches a maximum value as well as reducing the range of indoor temperature fluctuation. The insulation effect of this experiment room is worse than that of Embodiment 1, because the thermal conductivity of rubber-plastic sponge insulation board is similar to that of EPS foam board, but the thickness of the rubber-plastic sponge insulation board is much smaller than the EPS foam board.

Embodiment 8

The present embodiment differs from Embodiment 1 in that the insulation board is an aerogel felt with a thickness of 5 mm. Similar to Embodiment 1, the test results show that for the experiment room, the temperature fluctuation is decreased by 7° C., and the appearance of maximum temperature is delayed by 35 minutes; for the reference room, the temperature fluctuation is decreased by 2° C., and the appearance of maximum temperature is delayed by 5 minutes. Therefore, the above results indicate that the wall structure containing the shaped phase-change energy-storage insulation board has more excellent heat storage capacity, and may obviously improve the thermal inertia of the wall and delay the time when indoor temperature reaches a maximum value as well as reducing the range of indoor temperature fluctuation. The insulation effect of this experiment room is worse than that of Embodiment 1, because the thermal conductivity of aerogel felt insulation board is much smaller than that EPS foam board, but the thickness of the aerogel felt insulation board is much smaller than the EPS foam board.

Embodiment 9

The wall base 1 is built by a sand-lime brick and a cement-floated layer. A phenolic foam board with a thickness of 30 mm is selected as the insulation layer 2, and an MDF with a thickness of 50 mm is used as the oriented structural board 3. An inorganic hydrated salt of sodium sulfate decahydrate is heated and melted with a nucleating agent of borax after mixing, wherein a mass ratio of the nucleating agent to sodium sulfate decahydrate is 3:97, which are then compounded with a expanded vermiculite carrier, to obtain a novel inorganic composite phase-change material of expanded vermiculite based sodium sulfate decahydrate, with a phase-change temperature of 35° C. The molten sodium sulfate decahydrate accounts for 80% of the mass of the composite phase-change material, and the composite phase-change material is a solid at room temperature. A polyurethane resin with a mass fraction of 10% is light-cured on the surface of the composite phase-change material to coat it, greatly enhancing the durability of the inorganic composite phase-change material. The obtained inorganic composite phase-change material is subjected to a test for degree of undercooling, which is decreased by 13° C. as compared with the phase-change material of sodium sulfate decahydrate, showing that the degree of undercooling is greatly decreased and no liquid leakage occurs. A fiber cloth bag with a thickness of 15 mm is used as the packaging sheet 5 for the inorganic composite phase-change material, the composite phase-change material coated with the resin is filled in a cavity of the packaging sheet to obtain the shaped phase-change energy-storage insulation board 7, and an aluminum-plastic board with a thickness of 30 mm is used as the exterior decorative board 6, obtaining a structure shown in FIG. 1.

An experiment room and a reference room are constructed from the above wall structure, and the temperature fluctuation in the room over time is measured under one unit of sunlight intensity, wherein the shaped phase-change energy-storage insulation board 7 is placed inside the exterior decorative board of the experimental room, and no shaped phase-change energy-storage insulation board 7 is placed inside the exterior decorative board of the reference room. Then, the test results show that for the experiment room, the temperature fluctuation is decreased by 15° C., and the appearance of maximum temperature is delayed by 60 minutes; for the reference room, the temperature fluctuation is decreased by 5° C., and the appearance of maximum temperature is delayed by 15 minutes. Therefore, the above results indicate that the wall structure containing the shaped phase-change energy-storage insulation board has more excellent heat storage capacity, may obviously improve the thermal inertia of the wall and delay the time when indoor temperature reaches a maximum value as well as reducing the range of indoor temperature fluctuation, thereby decreasing the energy consumption for air conditioning and building heating as well as improving comfortableness.

Embodiment 10

The present embodiment differs from Embodiment 9 in that the oriented structural board is a blockboard with a thickness of 20 mm. Similar to Embodiment 9, the test results show that for the experiment room, the temperature fluctuation is decreased by 14° C., and the appearance of maximum temperature is delayed by 50 minutes; for the reference room, the temperature fluctuation is decreased by 4° C., and the appearance of maximum temperature is delayed by 12 minutes.

Therefore, the above results indicate that the wall structure containing the shaped phase-change energy-storage insulation board has more excellent heat storage capacity, and may obviously improve the thermal inertia of the wall and delay the time when indoor temperature reaches a maximum value as well as reducing the range of indoor temperature fluctuation. The insulation effect of this experiment room is similar to that of Embodiment 9.

Embodiment 11

The wall base 1 is built by a sand-lime brick and a cement-floated layer. An XPS extruded board with a thickness of 10 mm is selected as the insulation layer 2, and an oriented strand board (OSB board) with a thickness of 30 mm is used as the oriented structural board 3. An inorganic salt of anhydrous calcium chloride, a deionized water and a nucleating agent of strontium chloride hexahydrate are melted to obtain a saturated solution of calcium chloride hexahydrate, wherein a mass ratio of anhydrous calcium chloride to deionized water to strontium chloride hexahydrate is 10.28:10.0:0.41, which is then compounded with a expanded perlite carrier, to obtain a novel inorganic composite phase-change material of expanded perlite based calcium chloride hexahydrate, with a phase-change temperature of 27° C. The molten calcium chloride hexahydrate accounts for 55% of the mass of the composite phase-change material, and the composite phase-change material is a solid at room temperature. A polyurethane resin with a mass fraction of 15% is light-cured on the surface of the composite phase-change material to coat it, greatly enhancing the durability of the inorganic composite phase-change material. The obtained inorganic composite phase-change material is subjected to a test for degree of undercooling, which is decreased by 15° C. as compared with the phase-change material of sodium sulfate decahydrate, showing that the degree of undercooling is greatly decreased and no liquid leakage occurs. A PVC board with a thickness of 10 mm is used as the packaging sheet 5 for the inorganic composite phase-change material, the composite phase-change material coated with the resin is filled in a cavity of the packaging sheet to obtain the shaped phase-change energy-storage insulation board 7, and an aluminum veneer with a thickness of 20 mm is used as the exterior decorative board 6, obtaining a structure shown in FIG. 1. An experiment room and a reference room are constructed from the above wall structure, and the temperature fluctuation in the room over time is measured under one unit of sunlight intensity, wherein the shaped phase-change energy-storage insulation board 7 is placed inside the exterior decorative board of the experimental room, and no shaped phase-change energy-storage insulation board 7 is placed inside the exterior decorative board of the reference room. Then, the test results show that for the experiment room, the temperature fluctuation is decreased by 13° C., and the appearance of maximum temperature is delayed by 45 minutes; for the reference room, the temperature fluctuation is decreased by 5° C., and the appearance of maximum temperature is delayed by 15 minutes. Therefore, the above results indicate that the wall structure containing the shaped phase-change energy-storage insulation board has more excellent heat storage capacity, may obviously improve the thermal inertia of the wall and delay the time when indoor temperature reaches a maximum value as well as reducing the range of indoor temperature fluctuation, thereby decreasing the energy consumption for air conditioning and building heating as well as improving comfortableness.

Embodiment 12

The present embodiment differs from Embodiment 11 in that the exterior decorative board is a stained glass with a thickness of 10 mm. Similar to Embodiment 11, the test results show that for the experiment room, the temperature fluctuation is decreased by 13° C., and the appearance of maximum temperature is delayed by 45 minutes; for the reference room, the temperature fluctuation is decreased by 4° C., and the appearance of maximum temperature is delayed by 11 minutes.

Therefore, the above results indicate that the wall structure containing the shaped phase-change energy-storage insulation board has more excellent heat storage capacity, and may obviously improve the thermal inertia of the wall and delay the time when indoor temperature reaches a maximum value as well as reducing the range of indoor temperature fluctuation. The insulation effect of this experiment room is similar to that of Embodiment 11, because the exterior decorative board has less influence on the insulation effect in the room.

Embodiment 13

The present embodiment differs from Embodiment 11 in that the exterior decorative board is a PVC ceiling board with a thickness of 5 mm. Similar to Embodiment 11, the test results show that for the experiment room, the temperature fluctuation is decreased by 12° C., and the appearance of maximum temperature is delayed by 45 minutes; for the reference room, the temperature fluctuation is decreased by 4° C., and the appearance of maximum temperature is delayed by 10 minutes. Therefore, the above results indicate that the wall structure containing the shaped phase-change energy-storage insulation board has more excellent heat storage capacity, and may obviously improve the thermal inertia of the wall and delay the time when indoor temperature reaches a maximum value as well as reducing the range of indoor temperature fluctuation. The insulation effect of this experiment room is similar to that of Embodiment 11, because the exterior decorative board has less influence on the insulation effect in the room.

Embodiment 14

The wall base 1 is built by a sand-lime brick and a cement-floated layer. An aerogel felt with a thickness of 5 mm is selected as the insulation layer 2, and a finger jointed board with a thickness of 1 mm is used as the oriented structural board 3. Inorganic hydrated salts, i.e., calcium chloride hexahydrate and magnesium nitrate hexahydrate, are mixed and melted to obtain a molten phase-change material of calcium chloride hexahydrate/magnesium nitrate hexahydrate, which is then compounded with a fumed silica carrier to obtain an inorganic composite phase-change material of fumed silica based calcium chloride hexahydrate/magnesium nitrate hexahydrate, with a phase-change temperature of 10° C., wherein the molten phase-change material of calcium chloride hexahydrate/magnesium nitrate hexahydrate accounts for 40% of the mass of the composite phase-change material. The composite phase-change material is a solid at room temperature. A polyurethane resin with a mass fraction of 20% is light-cured on the surface of the composite phase-change material to coat it, greatly enhancing the durability of the inorganic composite phase-change material. Then the obtained inorganic composite phase-change material is subjected to a test for degree of undercooling, which is decreased by 15° C. as compared with the phase-change material of magnesium chloride hexahydrate/magnesium nitrate hexahydrate, showing that the degree of undercooling is greatly decreased and no liquid leakage occurs. A vacuum bag with a thickness of 0.2 mm is used as the packaging sheet 5 for the novel inorganic composite phase-change material, the composite phase-change material coated with the resin is filled in a cavity of the packaging sheet to obtain the shaped phase-change energy-storage insulation board 7, and a splint with a thickness of 1 mm is used as the exterior decorative board 6, obtaining a structure shown in FIG. 1.

An experiment room and a reference room are constructed from the above wall structure, and the temperature fluctuation in the room over time is measured under one unit of sunlight intensity, wherein the shaped phase-change energy-storage insulation board 7 is placed inside the exterior decorative board of the experimental room, and no shaped phase-change energy-storage insulation board 7 is placed inside the exterior decorative board of the reference room. Then, the test results show that for the experiment room, the temperature fluctuation is decreased by 8° C., and the appearance of maximum temperature is delayed by 40 minutes; for the reference room, the temperature fluctuation is decreased by 2° C., and the appearance of maximum temperature is delayed by 10 minutes. Therefore, the above results indicate that the wall structure containing the shaped phase-change energy-storage insulation board has more excellent heat storage capacity, may obviously improve the thermal inertia of the wall and delay the time when indoor temperature reaches a maximum value as well as reducing the range of indoor temperature fluctuation, thereby decreasing the energy consumption for air conditioning and building heating as well as improving the living comfortableness.

Embodiment 15

In an insulation structure of Embodiment 14, a surface of the packaging sheet of the inorganic composite phase-change material is affixed with a high-temperature resistant and fire resistant foil aluminum fiber cloth, so that the obtained shaped phase-change energy-storage insulation board 7 possesses good fire resistance.

Embodiment 16

In an insulation structure of Embodiment 15, the wall base 1, the insulation layer 2, the oriented structural board 3, the shaped phase-change energy-storage insulation board 7, and the exterior decorative board 6 are bonded by a foam rubber.

The embodiments are not intended to limit the disclosure in any other forms, and any modification or equivalent changes made according to the technical essence of the disclosure still fall within the scope of the disclosure.

What is claimed is:

1. A phase-change energy-storage structure for building insulation, comprising a shaped phase-change energy-storage insulation board provided at an interior wall surface of a building, wherein a wall structure is provided with a wall base, an insulation layer, an oriented structural board, the shaped phase-change energy-storage insulation board, and an exterior decorative board in sequence from outdoor to indoor of the building;

the shaped phase-change energy-storage insulation board is composed of an inorganic composite phase-change material and a packaging sheet; the inorganic composite phase-change material has a phase-change temperature of 10 to 40° C., obtained by compounding an inorganic hydrated salt and a porous structural carrier; in the inorganic composite phase-change material, a mass percentage of the inorganic hydrated salt is 40 to 95%, and the inorganic composite phase-change material is coated with a fire resistant and corrosion resistant light-cured resin.

2. The phase-change energy-storage structure for building insulation according to claim 1, wherein the shaped phase-change energy-storage insulation board is prepared by steps of:

(1) heating and melting an inorganic salt, a deionized water and a nucleating agent or directly heating and melting the inorganic hydrated salt, to obtain an inorganic hydrated salt phase-change substance in a liquid state, wherein the nucleating agent is one or more of borax, strontium chloride hexahydrate, $CaF_2$, C powder, and $Na_4P_2O_7 \cdot 6H_2O$, and a mass ratio of the nucleating agent to the inorganic hydrated salt is 0.5:99.5 to 10:90;

(2) adsorbing the inorganic hydrated salt phase-change substance in a molten state on a surface and inside of pores of the porous structural carrier in a vacuum environment, and stirring sufficiently;

(3) curing at a temperature lower than a phase-change temperature of the inorganic hydrated salt phase-change substance to obtain the inorganic composite phase-change material;

(4) coating the inorganic composite phase-change material with the fire resistant and corrosion resistant light-cured resin;

(5) encapsulating the coated inorganic composite phase-change material in the packaging sheet to obtain the shaped phase-change energy-storage insulation board.

3. The phase-change energy-storage structure for building insulation according to claim 2, wherein the inorganic hydrated salt is one or more of sodium acetate trihydrate, sodium thiosulfate pentahydrate, calcium chloride hexahydrate, magnesium chloride hexahydrate, magnesium nitrate hexahydrate, magnesium nitrate heptahydrate, barium hydroxide octahydrate, sodium sulfate decahydrate, sodium hydrogen phosphate dodecahydrate, ammonium aluminium sulfate dodecahydrate and aluminum sulfate octadecahydrate.

4. The phase-change energy-storage structure for building insulation according to claim 1, wherein the wall base comprises a sand-lime brick and a cement-floated layer; the insulation layer is a fire resistant insulation panel; the fire resistant insulation panel is one or more of ceramic insulation board, XPS extruded board, EPS foam board, foam cement, perlite and perlite brick, vermiculite and vermiculite brick, phenolic foam, rubber-plastic sponge, glass wool, rock wool and aerogel felt, with a thickness of 5 mm to 200 mm.

5. The phase-change energy-storage structure for building insulation according to claim 1, wherein the oriented structural board is one or more of plywood, medium-density fiberboard (MDF), oriented strand board (OSB), blockboard and finger jointed board, with a thickness of 1 mm to 100 mm; the exterior decorative board is one or more of gypsum board, splint, aluminum veneer, PVC ceiling, stained glass, and aluminum-plastic board, with a thickness of 1 mm to 50 mm; the exterior decorative board has a groove matching the shaped phase-change energy-storage insulation board.

6. The phase-change energy-storage structure for building insulation according to claim 1, wherein the packaging sheet is aluminum foil bag, PVC board, fiber cloth bag or vacuum bag; the packaging sheet has a thickness of 0.2 mm to 20 mm; the packaging sheet forms a cavity structure.

7. The phase-change energy-storage structure for building insulation according to claim 1, wherein a high-temperature resistant and fire resistant foil aluminum fiber cloth is affixed to a surface of the packaging sheet.

8. The phase-change energy-storage structure for building insulation according to claim 1, wherein the porous structural carrier is one or more of expanded graphite, expanded perlite, expanded vermiculite, diatom bodies, montmorillonite, foam aluminum, foam copper, carbon foam, fumed silica, and aluminum oxide.

9. The phase-change energy-storage structure for building insulation according to claim 1, wherein the fire resistant and corrosion resistant resin is one or two of epoxy acrylate and polyurethane.

10. The phase-change energy-storage structure for building insulation according to claim 1, wherein the wall base, the insulation layer, the oriented structural board, the shaped phase-change energy-storage insulation board, and the exterior decorative board are bonded by a foam rubber.

\* \* \* \* \*